(12) United States Patent
Hayakawa

(10) Patent No.: US 11,279,467 B2
(45) Date of Patent: Mar. 22, 2022

(54) AIRCRAFT CONTROL SYSTEM

(71) Applicant: SUBARU CORPORATION, Tokyo (JP)

(72) Inventor: Masahito Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 350 days.

(21) Appl. No.: 16/590,913

(22) Filed: Oct. 2, 2019

(65) Prior Publication Data
US 2020/0122821 A1 Apr. 23, 2020

(30) Foreign Application Priority Data

Oct. 17, 2018 (JP) .............................. JP2018-195482
Sep. 4, 2019 (JP) .............................. JP2019-160814

(51) Int. Cl.
*B64C 13/20* (2006.01)
*B64C 13/24* (2006.01)
*G08G 5/00* (2006.01)

(52) U.S. Cl.
CPC .............. *B64C 13/20* (2013.01); *B64C 13/24* (2013.01); *G08G 5/0047* (2013.01)

(58) Field of Classification Search
CPC ...... B64C 13/20; B64C 13/24; G08G 5/0047; G06F 11/1629
See application file for complete search history.

(56) References Cited

U.S. PATENT DOCUMENTS 5,550,736 A 8/1996 Hay et al.
9,412,278 B1 * 8/2016 Gong ................... G08G 5/0052
(Continued)

FOREIGN PATENT DOCUMENTS

EP 3046092 A1 * 7/2016 ........... G08G 5/0013
EP 3640801 A1 * 4/2020 .......... G06F 11/1629
(Continued)

OTHER PUBLICATIONS

M. Sghairi et al., "Challenges in Building Fault—Tolerant Flight Control System for a Civil Aircraft", IAENG International Journal of Computer Science, Nov. 20, 2008, pp. 495-499. no (Year: 2008).*
(Continued)

*Primary Examiner* — Behrang Badii
*Assistant Examiner* — Jalal C Coduroglu
(74) *Attorney, Agent, or Firm* — McDermott Will & Emery LLP

(57) ABSTRACT

An aircraft control system has a flight specification acquisition sensor for acquiring flight specifications of an aircraft and outputting the respective numerical values, and a plurality of flight computers, each having the same control software and performing airframe control based on the flight specification numerical values, thereby constituting a redundant system of flight control functions. Further, the control system includes a noise generator for the plurality of flight computers, which generates a plurality of noises different from each other, and the plurality of noises are individually superimposed on the numerical value of one flight specification output from the flight specification acquisition sensor to generate a plurality of new flight specification numerical values different from each other which are then output to the plurality of flight computers. This configuration ensures redundancy of the aircraft control software against potential bugs using the same control software.

4 Claims, 3 Drawing Sheets

(56) References Cited

U.S. PATENT DOCUMENTS

| | | | |
|---|---|---|---|
| 9,799,226 B2 * | 10/2017 | Mizutani | G01C 21/20 |
| 2009/0152391 A1 * | 6/2009 | McWhirk | B64B 1/02 |
| | | | 244/30 |
| 2015/0073624 A1 | 3/2015 | Takahashi et al. | |
| 2015/0261379 A1 * | 9/2015 | Kneuper | G08G 5/0052 |
| | | | 345/173 |
| 2017/0192089 A1 * | 7/2017 | Parker | G08G 5/0082 |
| 2018/0074155 A1 * | 3/2018 | Onomura | G01S 19/49 |
| 2018/0196435 A1 * | 7/2018 | Kunzi | G05D 1/0202 |
| 2018/0232097 A1 * | 8/2018 | Kneuper | G08G 5/0034 |
| 2018/0241462 A1 * | 8/2018 | Mizutani | H04B 7/18504 |
| 2019/0056512 A1 * | 2/2019 | Onomura | G01C 21/005 |
| 2020/0122821 A1 * | 4/2020 | Hayakawa | G06F 11/1629 |

FOREIGN PATENT DOCUMENTS

| | | | | |
|---|---|---|---|---|
| JP | 5808781 B2 | | 11/2015 | |
| KR | 20160094397 A | * | 8/2016 | A61B 5/0024 |
| WO | 95/29434 A1 | | 11/1995 | |
| WO | WO-2016154944 A1 | * | 10/2016 | B64C 39/024 |
| WO | WO-2016154947 A1 | * | 10/2016 | G08G 5/0008 |
| WO | WO-2016154948 A1 | * | 10/2016 | G06F 21/31 |
| WO | WO-2017026337 A1 | * | 2/2017 | B64C 39/028 |

OTHER PUBLICATIONS

M. Sghairi et al., "Challenges in Building Fault—Tolerant Flight Control System for a Civil Aircraft", IAENG International Journal of Computer Science, Nov. 20, 2008, pp. 495-499.

Extended European Search Report issued in corresponding European Patent Application No. 19201391.0-1224, dated Mar. 25, 2020.

* cited by examiner

AIRCRAFT CONTROL SYSTEM

CROSS-REFERENCE TO RELATED APPLICATIONS

The present application claims priorities from Japanese Patent Application No. 2018-195482 filed on Oct. 17, 2018, and Japanese Patent Application No. 2019-160814 filed on Sep. 4, 2019, the entire contents of which are hereby incorporated by reference.

BACKGROUND

The present disclosure relates to a technique for ensuring redundancy in aircraft flight control functions.

Japanese Patent (JP-B) No. 5808781 discloses a plurality of aircraft control devices has been disposed in each aircraft to configure redundancies in hardware.

In particular, flight control systems that require a particularly high degree of safety, such as flight control systems for large aircraft, are equipped with a plurality of other control software having the same function in order to prepare for an abnormality, such as an emergency stop caused by a software bug.

SUMMARY

An aspect of the disclosure provides an aircraft control system mountable on an aircraft. The system includes a flight specification acquisition unit, flight controllers, a noise generator, and a noise outputting unit. The flight specification acquisition unit is configured to acquire flight specifications of the aircraft and outputting numerical values thereof. The flight controllers each have a same control software configured to perform an arithmetic operation for controlling the airframe based on the flight specification numerical values, thereby constituting a redundant system of flight control function. The noise generator is designed for the flight controllers and configured to generate a noises different from each other. The noise outputting unit is configured to individually superimpose the noises on the numerical value of one of the flight specifications output from the flight specification acquisition unit generate new numerical values of flight specifications different from each other, and output the new numerical values to the flight controllers.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
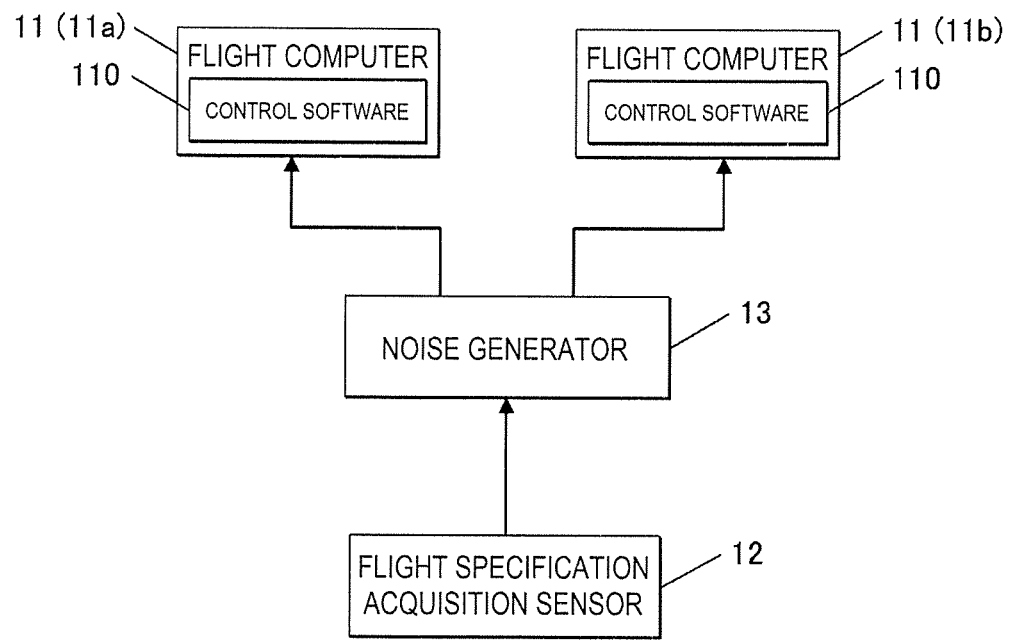
FIG. 1 is a block diagram illustrating a schematic configuration of a control system according to an embodiment.

The system configuration of JP-B No. 5808781 requires a plurality of control software, which turns out increasing the development cost of the software.

It is desirable to provide an adequately ensure redundancy for control software of an aircraft against potential bugs while using the same control software.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

<Configuration of a Control System>

First, a configuration of a control system 10 of an aircraft in the present embodiment will be described.

FIG. 1 is a block diagram showing a schematic configuration of the control system 10.

As shown in FIG. 1, the control system 10 is disposed on an aircraft to control an airframe, with including two flight computers 11 (11a, 11b) and a flight specification acquisition sensor 12.

The two flight computers 11 control the operation of each part of the airframe (not shown) based on information received from the flight specification acquisition sensor 12. The flight computers 11 each are the computer disposed with CPU (Central Processing Unit), memory (storage device), and the like, and have hardware specification such as processing capability covering normal control loads.

Control software 110 is installed to each flight computer 11 for performing an arithmetic operation for airframe control based on information from the flight specification acquisition sensor 12. The control software 110 is configured to determine that a flight specification numerical value before superimposing noise and a new flight specification numerical value after superimposing noise are the same, and to perform a calculation for airframe control, as will be described later.

These two flight computers 11 constitute a redundant system of the flight control function, where one flight computer 11a serves as a main computer and the other flight computer 11b serves as a slave computer. That is, although the two flight computers 11 operate in parallel, only one flight computer 11a normally performs a control function, and when an abnormality occurs in this flight computer 11a, the control function is assigned to the other flight computer 11b. The detection of the abnormality and the assigning of the function may be performed by any of the flight computers 11, or may be performed by other detectors and controllers.

The flight specification acquisition sensor 12 acquires flight specifications (e.g., position, height, speed, attitude of the airframe) necessary for calculations for controlling the aircraft, and outputs the acquired information (i.e., numerical value) to the flight computer 11. "Flight specifications" include a predetermined numerical value group, and the predetermined numerical value group stops the control software 110 when the predetermined numerical value group is input, as described later.

The control system 10 includes a noise generator 13 between the flight specification acquisition sensor 12 and the two flight computers 11.

The noise generator 13 superimposes a plurality of different noises individually on the numerical value of the flight specification output from the flight specification acquisition sensor 12 so as to output the respective superimposed values to the two flight computers 11. That is, the noise generator 13 superimposes a minute noise on at least one of the numerical values of the flight specifications output from the flight specification acquisition sensor 12 so that the numerical values are different from each other, and then outputs the respective superimposed values to the two flight computers 11. In other words, the noise generator 13 is used for a plurality (two) of flight computers 11 and generates a plurality (two) of noises different each other. The noise generator 13 then individually superimposes the plurality of generated noises on the numerical value of one flight specification output from the flight specification acquisition sensor 12, generates a plurality of new flight specification numerical values different from each other, and outputs the plurality of new flight specification numerical values to the plurality of flight computers 11.

Here, "noise" refers to random numbers generated randomly in the present embodiment. "Minute" noise means, in the present embodiment, noise that is small enough, to the extent substantially not to change the S/N ratio of the original signal on which the noise is superimposed. However, the noise according to the present disclosure may be a numerical value smaller than the original signal (the numerical value of the flight specification) on which the noise is superimposed, which may include zero. In this regard, the numerical value of the flight specification before superimposing noise and the numerical value of the new flight specification after superimposing noise may be the same. Also, "superimposing" noise refers to superimposing noise on the original signal (numerical value). The numerical value of "one" flight specification refers to a numerical value representing one flight specification and includes a plurality of sets such as signals (x, y, z) as described later.

<Operation of Control System>

Next, the operation of the control system 10 will be described.

Figure 2:
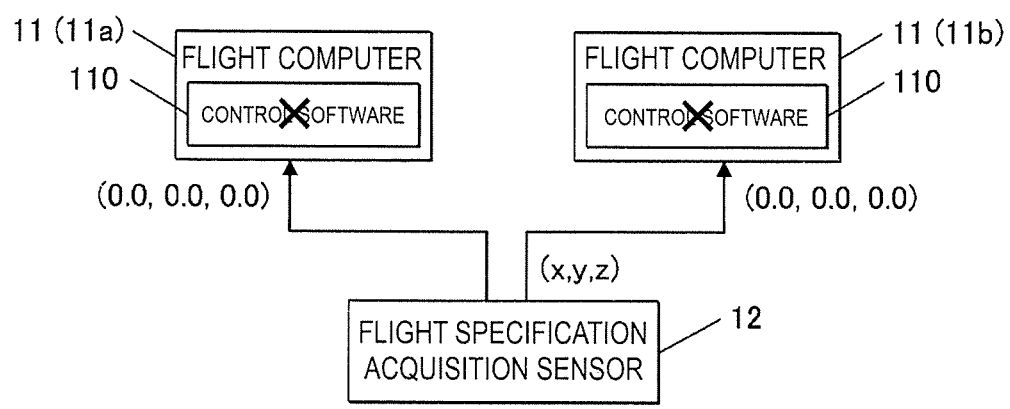
FIG. 2 is a diagram illustrating an operation of the control system without a noise generator.
Figure 3:
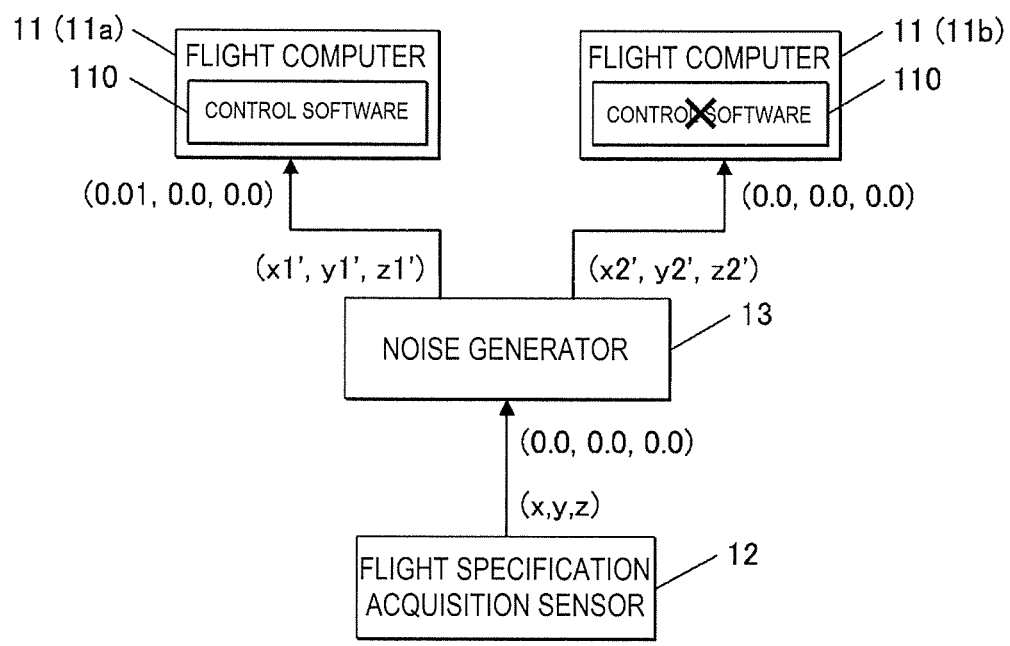
FIG. 3 is a diagram illustrating an operation of the control system of the embodiment.

FIG. 2 is a diagram illustrating the operation of the control system 10 without providing a noise generator 13, and FIG. 3 is a diagram illustrating the operation of the control system 10.

The control software 110 of each flight computer 11 acquires the input of the parameters x, y, and z from the flight specification acquisition sensor 12. It is also assumed that the control software 110 has a bug stopping the software when all the input values of x, y, and z become "0.0" at the same time.

In such a case, as shown in FIG. 2, if the flight specification acquisition sensor 12 is directly connected to each flight computer 11, the control software 110 of both flight computers 11 are stopped and redundancy is not ensured when signals of x, y, and z 0.0 are input from the flight specification acquisition sensor 12.

However, in the control system 10 of the present embodiment, the flight specification acquisition sensor 12 is connected to each flight computer 11 via the noise generator 13. Therefore, as shown in FIG. 3, even when signals (x, y, z=0.0, 0.0, 0.0) causing bugs are output from the flight specification acquisition sensor 12, the signals to the two flight computers 11 are different from each other due to the minute noise superimposed by the noise generator 13. In the example of FIG. 3, noise 0.01 is added to only the parameter x to one flight computer 11a, and only the other flight computer 11b is stopped. More precisely, noise (x, y, z=0.01, 0.0, 0.0) is superimposed on the signal to one flight computer 11a, and different noise (x, y, z=0.0, 0.0, 0.0) is superimposed on the signal to the other flight computer 11b.

As described above, the two flight computers 11 always perform calculations based on slightly different input values. Therefore, even if there is a potential bug that occurs when a specific numerical value is input to the control software 110, it is possible to avoid a situation in which the bug occurs simultaneously in both of the flight computers 11, thereby ensuring redundancy.

As described above, according to the present embodiment, a plurality of noises different from each other are individually superimposed by the noise generator 13 on the numerical value of one of the flight specifications output from the flight specification acquisition sensor 12 to generate a plurality of new flight specification numerical values which are then output to the respective plurality of flight computers 11. As a result, since numerical values differing slightly by the amount of noise are input to the plurality of flight computers 11, even when the plurality of flight computers 11 have the same control software 110, a situation in which the control software 110 generates the same bug can be avoided.

Thus, redundancy of the aircraft control software 110 against potential bugs using the same control software 110 can be ensured.

<Modified Example>

Embodiments to which the present disclosure can be applied are not limited to the above-described embodiment, and can be appropriately changed within a range not departing from the spirit of the present disclosure.

For example, in the above embodiment, the case where two flight computers 11 are used has been described, but the number of flight computers 11 is not particularly limited.

The invention claimed is:

1. An aircraft control system mountable on an aircraft, the system comprising:

a flight specification acquisition unit configured to acquire flight specifications of the aircraft and output numerical values thereof, flight controllers constituting a redundant system of flight control functions, each of the flight controllers having a same control software configured to perform an arithmetic operation for aircraft control on a basis of the numerical values of the flight specifications, a noise generator for the flight controllers, the noise generator being configured to generate noises different from each other; and a noise outputting unit configured to individually superimpose the noises on the numerical value of one of the flight specifications output from the flight specification acquisition unit, and generating new numerical values of flight specifications different from each other, and outputting the new numerical values to the flight controllers.

2. The aircraft control system of claim 1, wherein the flight controllers comprises a first flight controller and a second flight controller, wherein the noise generator generates a first noise and a second noise; and wherein the noise outputting unit superimposes the first noise on the numerical value of the flight specification to generate a numerical value of a first new flight specification and output the numerical value of a first new flight specification to the first flight controller, and superimposes the second noise on the numerical value of the flight specification to generate a numerical value of a second new flight specification and output the numerical value of a second new flight specification to the second flight controller.

3. The aircraft control system according to claim 1, wherein the noise superimposed on the numerical value of the flight specification output from the flight specification acquisition unit is a numerical value smaller than the numerical value of the flight specification, and wherein the control software is configured to determine that the flight specification numerical value before superimposing the noise and the new flight specification numerical value after superimposing the noise are same.

4. The aircraft control system according to claim 2, wherein the noise superimposed on the numerical value of the flight specification output from the flight specification acquisition unit is a numerical value smaller than the numerical value of the flight specification, and wherein the control software is configured to determine that the flight specification numerical value before superimposing the noise and the new flight specification numerical value after superimposing the noise are same.

\* \* \* \* \*